United States Patent [19]

Early et al.

[11] Patent Number: 5,610,579
[45] Date of Patent: Mar. 11, 1997

[54] APPARATUS AND METHOD FOR SELECTING A CONTROL SOURCE FOR AN ELECTRICAL SWITCHING DEVICE

[75] Inventors: Michael G. Early, Hendersonville; Pamela S. Combs, Horseshoe, both of N.C.

[73] Assignee: Eaton Corporation, Cleveland, Ohio

[21] Appl. No.: 557,889

[22] Filed: Nov. 14, 1995

[51] Int. Cl.⁶ .................................................. G08B 23/00
[52] U.S. Cl. ............... 340/517; 340/825.72; 340/825.73; 361/1; 381/16; 49/25; 49/28
[58] Field of Search ..................................... 340/525, 511, 340/825.72, 825.73, 825.76, 679; 361/1, 53; 381/16, 282, 283, 286; 49/25, 26, 28; 160/292, 293.1

[56] References Cited

U.S. PATENT DOCUMENTS

| | | | |
|---|---|---|---|
| 4,475,069 | 10/1984 | Tadokoro et al. | 318/265 |
| 4,760,364 | 7/1988 | Ostby | 335/132 |
| 4,766,273 | 8/1988 | Butterworth et al. | 200/147 R |
| 4,827,369 | 5/1989 | Saletta et al. | 361/96 |
| 4,963,846 | 10/1990 | Grunert et al. | 335/42 |
| 5,347,755 | 9/1994 | Jaster et al. | 49/25 |

OTHER PUBLICATIONS

Installation/Configuration Instructions for 42GNP-9000 Diffuse Photoelectric Sensor for DeviceNet™, Publication PA-9412(A), Allen-Bradley, Jul. 1994, 2 pp.

Advantage Control Modules: The Simplest Way To Control A Motor, Distribution & Control, Westinghouse, Apr. 1993, 6 pp.

Primary Examiner—Jeffrey Hofsass
Assistant Examiner—Daryl C. Pope
Attorney, Agent, or Firm—Larry G. Vande Zande

[57] ABSTRACT

A controller for an electrical switching device such as a motor starting contactor including separable contacts, an operating mechanism for operating the separable contacts and a control mechanism responsive to a plurality of control sources for controlling the operating mechanism, includes a plurality of light emitting diode indicators each of which corresponds to one of the control sources; a membrane pushbutton; and a selection circuit, responsive to the pushbutton for selecting one of the control sources, including a circuit for detecting actuation of the pushbutton; a circuit responding to the actuation for sequentially indicating representations of at least some of the control sources on the corresponding ones of the indicators; and a circuit for detecting de-actuation of the pushbutton to select one of the control sources the representation of which is indicated on the corresponding one of the indicators at the time of the de-actuation.

19 Claims, 3 Drawing Sheets

APPARATUS AND METHOD FOR SELECTING A CONTROL SOURCE FOR AN ELECTRICAL SWITCHING DEVICE

BACKGROUND OF THE INVENTION

1. Field of the Invention

This invention relates to a controller for an electrical switching device and, more particularly, to a controller for selecting a control source for a motor starter. The invention also relates to an electrical switching device adapted for control by a plurality of control sources and, more particularly, to a motor starter including a selection circuit for selecting one of the control sources. The invention further relates to a method for controlling an electrical switching device and, more particularly, to a method for selecting a control source for a motor starter.

2. Background Information

Electrical switching devices include, for example, circuit switching devices and circuit interrupters such as circuit breakers, contactors, motor starters and motor controllers. Circuit breakers, which are well-known in the art, are generally used to protect electrical circuitry from damage due to an overcurrent condition, such as an overload fault or a relatively high level short circuit condition. Molded case circuit breakers, for example, include at least one pair of separable contacts which are operated either manually by way of a handle disposed on the outside of the case or automatically by way of an internal trip unit in response to an overcurrent condition.

When the circuit breaker is on, a movable contact assembly is in contact with a stationary or fixed contact assembly. The closed contacts conduct a flow of current between a line terminal and a load terminal. When the circuit breaker trips or is switched off, the movable contact assembly is moved away from the fixed contact assembly, thus, interrupting the flow of current between the line and load terminals. Examples of molded case circuit breakers are disclosed in U.S. Pat. Nos. 4,827,369; and 4,963,846.

Some types of circuit breakers include an electro-mechanical trip unit which interrupts current flow in two or more modes of operation. The electro-mechanical trip unit generally senses overload currents of up to about five to six times normal rated current as well as short circuit currents of greater than about ten times normal rated current. Other types of circuit breakers include an electronic trip unit for automatically interrupting the current flow.

Additional types of circuit interrupters include, for example, contactors, motor starters, motor controllers, lighting controllers, other load controllers and other electromechanical switching devices used for controlling a variety of electrical loads. Electromagnetic contactors, for example, include a plurality of movable electrical contacts which are brought into contact with a plurality of fixed electrical contacts to close the contactor. The movable electrical contacts are separated from the fixed contacts to open the contactor. Examples of contactors are disclosed in U.S. Pat. Nos. 4,760,364; and 4,766,273.

A common type of starter for loads such as motors, lighting, and the like, comprises an electromagnetic contactor with an overload relay. In a motor starter, for example, the purpose of the overload relay is to estimate the heat produced in the motor by line current and "trip" or stop the motor if the retained heat exceeds an acceptable level. The overload relay monitors the load current and trips the contactor open if a persistent overcurrent condition exists. Typically, the overload relay tracks an $I^2t$ characteristic of the load current which is a measure of heating.

Today, it is common for the overload relay to contain a microprocessor which digitally generates the $I^2t$ characteristic. When the calculated $I^2t$ value reaches a trip level, the contactor is tripped open to interrupt the flow of current to the load.

It is known to utilize a plurality of control sources for controlling a contactor or motor starter. For example, a known motor starter control module utilizes three pushbuttons and three corresponding indicator lights to select and indicate one of three control sources such as HAND, OFF and AUTO. With the HAND control source selected, the AUTO control source is disabled, and two local pushbuttons on the control module are used to control the associated motor starter in order to start and stop the motor. With the AUTO control source selected, the local pushbuttons are disabled, and a local communication device communicates with a remote control device which controls the motor starter. When the OFF control source is selected, both the HAND and AUTO control sources are disabled and the motor is stopped.

It is also known to utilize a control module having a "3" terminal (i.e., ENABLE). The "3" terminal is interconnected with remote contacts which provide a control voltage signal to start or stop the motor.

It is further known to utilize mechanical latching, interlocking switches in order to prevent the selection of more than one control source for a contactor.

It is also known to utilize a plural position rotary switch to select one of a plurality of control sources for a contactor. In order to guarantee that two control sources are not simultaneously selected, intermediate states of the rotary switch, between the various control source positions, select the OFF control source which stops the motor. Hence, there is room for improvement.

It is further known to utilize an integrated logic circuit and a plurality of membrane switches with a corresponding plurality of indicator lights in order to select one of a corresponding plurality of control sources for a contactor. However, there is room for improvement of the cost and size of the associated control station.

There exists a need, therefore, for a low cost, compact, simple to use solution for selecting one of a plurality of control sources for a contactor or motor starter.

SUMMARY OF THE INVENTION

The present invention is directed to a control apparatus for an electrical switching device including separable contacts, an operating mechanism for operating the separable contacts and a control mechanism responsive to a plurality of control sources for controlling the operating mechanism, with the control apparatus including plural indicator mechanisms each of which corresponds to one of the control sources; a switch mechanism; and a selection mechanism responsive to the switch mechanism for selecting one of the control sources, with the selection mechanism including a mechanism for detecting actuation of the switch mechanism; a mechanism responding to the actuation for sequentially indicating representations of at least some of the control sources on the corresponding ones of the indicator mechanisms; and a mechanism for detecting de-actuation of the switch mechanism to select one of the control sources the representation of which is indicated on the corresponding one of the indicator mechanisms at the time of the de-actuation.

As another aspect of the invention, an electrical switching device, adapted for control by a plurality of control sources, includes separable contacts; an operating mechanism for operating the separable contacts; a control mechanism responsive to the control sources for controlling the operating mechanism; plural indicator mechanisms each of which corresponds to one of the control sources; a switch mechanism; and a selection mechanism responsive to the switch mechanism for selecting one of the control sources, with the selection mechanism including a mechanism for detecting actuation of the switch mechanism; a mechanism responding to the actuation for sequentially indicating representations of at least some of the control sources on the corresponding ones of the indicator mechanisms; a mechanism for detecting de-actuation of the switch mechanism to select one of the control sources the representation of which is indicated on the corresponding one of the indicator mechanisms at the time of the de-actuation; and a mechanism for connecting the selected one of the control sources to the control mechanism.

As a further aspect of the invention, a motor starter, adapted to be controlled from a plurality of control sources, includes an electrical contactor mechanism including separable contacts and an operating mechanism for opening and closing the separable contacts; an overload relay mechanism operatively associated with the electrical contactor mechanism and responsive to the control sources for controlling the operating mechanism; plural indicator mechanisms each of which corresponds to one of the control sources; a switch mechanism; and a selection mechanism responsive to the switch mechanism for selecting one of the control sources, with the selection mechanism including a mechanism for detecting actuation of the switch mechanism; a mechanism responding to the actuation for sequentially indicating representations of at least some of the control sources on the corresponding ones of the indicator mechanisms; a mechanism for detecting de-actuation of the switch mechanism to select one of the control sources the representation of which is indicated on the corresponding one of the indicator mechanisms at the time of the de-actuation; and a mechanism for connecting the selected one of the control sources to the overload relay mechanism.

As another aspect of the invention, a method for selecting one of a plurality of control sources for an electrical switching device including a switch, a plurality of indicators each of which corresponds to one of the control sources, separable contacts, an operating mechanism for operating the separable contacts and a control mechanism responsive to the control sources for controlling the operating mechanism, includes detecting actuation of the switch; responding to the actuation and sequentially indicating representations of at least some of the control sources on the corresponding ones of the indicators; detecting de-actuation of the switch; selecting one of the control sources the representation of which is indicated on the corresponding one of the indicators at the time of the de-actuation; and connecting the selected one of the control sources to the control mechanism.

It is an object of the present invention to select one of a plurality of control sources for a motor starter using a single pushbutton and a plurality of indicators corresponding to the control sources.

It is another object of the present invention to select one of a plurality of control sources for a motor starter without necessarily stopping the motor associated therewith.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "control source" shall expressly include, but not be limited to any source which directly or indirectly controls the state of one or more separable contacts or which directly or indirectly controls or inhibits another control source.

As employed herein, the term "signal" shall expressly include, but not be limited to any input or output utilized for control and/or monitoring such as, for example, analog signals, digital signals, discrete signals, commands, serial signals or serial messages.

Figure 1:
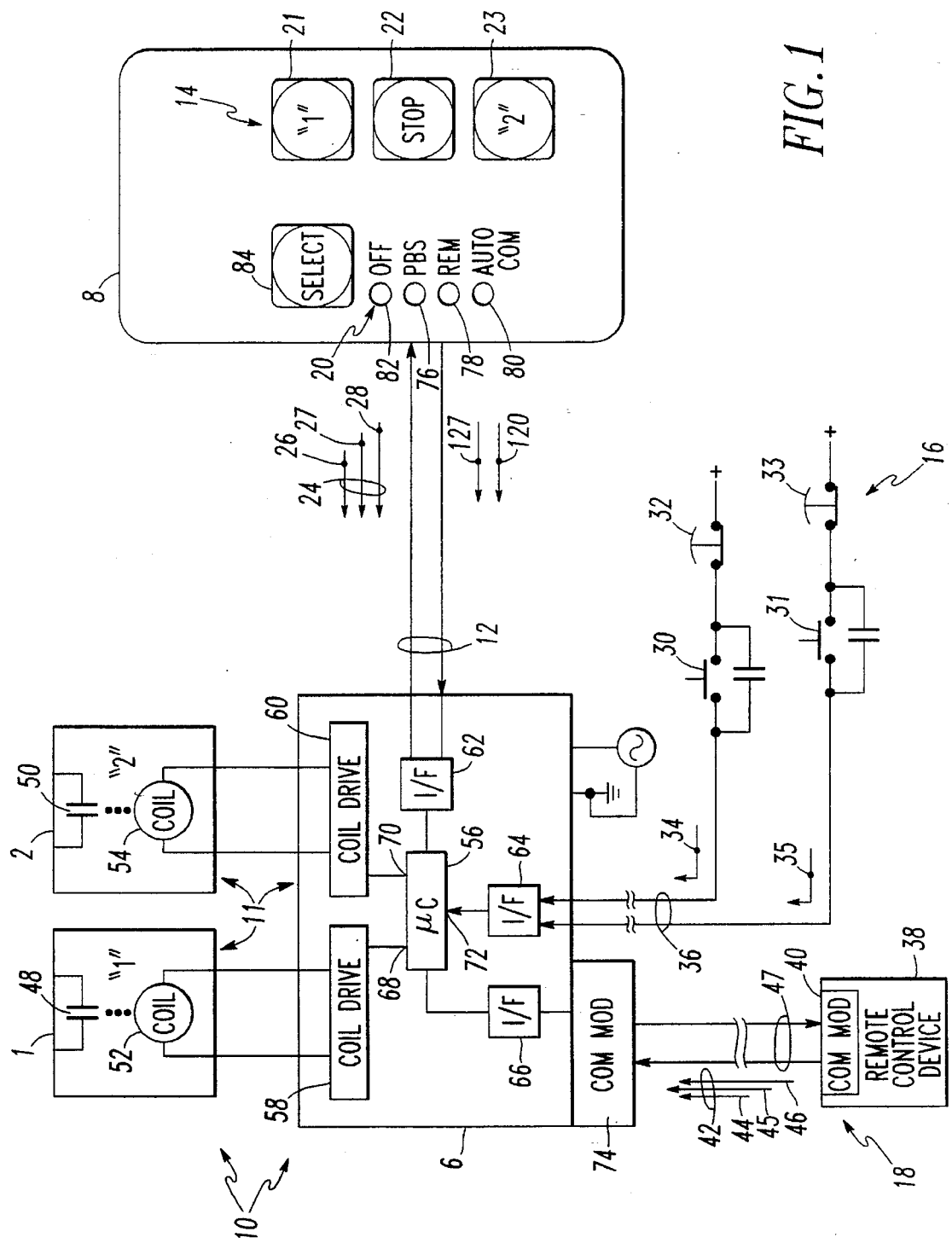
FIG. 1 is a schematic diagram mostly in block form of two electrical contactors, an overload relay for the contactors and a pushbutton station in accordance with the invention.

Referring to FIG. 1, two electrical contactors 1,2 (respectively labelled "1" and "2"), an overload relay 6, and a controller such as pushbutton station 8 are illustrated, although the invention is applicable to a wide variety of electrical switching devices and circuit interrupters such as, for example, circuit breakers, contactors or motor starting contactors such as a speed controller, a reverser or a single contactor and an associated overload relay. The contactor 1 and the overload relay 6 form a motor starter 10. The contactors 1,2 and the overload relay 6 form a reverser 11. The pushbutton station 8 is interconnected with the exemplary motor starter 10 by a serial communication link 12, although the invention is applicable to a wide variety of interconnections such as discrete connections, network communication links for controllers for electrical switching devices, and a controller integrated with an electrical switching device.

The exemplary motor starter 10 and reverser 11 are adapted for control by a plurality of control sources 14,16, 18,20, although the invention is applicable to any electrical switching device which is adapted for control by any number of control sources. The control source 14 includes switches such as membrane pushbuttons 21,22,23 of the pushbutton station 8 which sources local serial control messages 24 to the serial communication link 12. The messages 24 include a local start message 26 for contactor 1, a local start message 27 for contactor 2, and a local stop message 28 for the contactors 1,2. Typically, the pushbutton station 8 is located locally with respect to the overload relay 6, with the serial communication link 12 being up to about 15 feet in length, although significantly longer lengths are possible using modems, repeaters or other circuits providing an extended communication link.

The control source 16 includes switches such as contacts 30,31,32,33 which source remote start-stop/control signals 34,35 to a remote connection 36. In the exemplary embodiment, when the control source 16 is selected, the signal 34 starts and stops the contactor 1 and the signal 35 starts and stops the contactor 2. Typically, the contacts 30–33 are located remotely with respect to the overload relay 6, with the length of the remote connection 36 being longer than the length of the serial communication link 12, although shorter lengths are possible.

The control source 18 includes a remote control device 38 having a communication module (COM MOD) 40 which sources remote serial control messages 42 including a remote start message 44 for contactor 1, a remote start message 45 for contactor 2 and a remote stop message 46 for the contactors 1,2 to a serial communication link 47. Typically, the remote control device 38 is located remotely with respect to the overload relay 6, with the length of the serial communication link 47 being longer than the length of the serial communication link 12, although shorter lengths are possible.

The exemplary electrical contactors 1,2 include separable contacts 48,50 and coils 52,54 which provide an operating mechanism for moving the separable contacts 48,50 between an off position when the coils 52,54 are de-energized and an on position when the coils 52,54, respectively, are energized. As described in greater detail below, when the control source 20 (i.e., OFF) is selected, the previously selected one of the control sources 14,16,18 is de-selected and the separable contacts 48,50 are moved to the off position. The overload relay 6 is operatively associated with the electrical contactors 1,2 and provides a control mechanism which is responsive to the control sources 14,16,18,20 for controlling the coils 52,54. One of the modular contactors 1,2 and the overload relay 6 are disclosed in greater detail in concurrently filed, commonly assigned, copending application Ser. No. 08/558,634, entitled "Motor Control System" (Attorney Docket Number 95-ST2-122(DC)).

The exemplary overload relay 6 includes a microcomputer (μC) 56, coil drive circuits 58,60 and interfaces (I/F) 62,64,66, although the invention is applicable to any type of overload relay or analog, digital or electromechanical electrical switching device which is adapted for control by control sources. The coil drive circuits 58,60 convert microcomputer digital outputs 68,70 to suitable signals for energizing and controlling the coils 52,54, respectively. The interface 62 interfaces the serial communication link 12 and provides a mechanism for inputting the local serial control messages 24 from the pushbutton station 8 to the microcomputer 56. The interface 64 interfaces the remote connection 36 from the contacts 30–33 and provides a mechanism for inputting the remote control signals 34,35 to corresponding digital inputs 72 of the microcomputer 56. The interface 66 interfaces a communication module (COM MOD) 74 with the microcomputer 56. In turn, the communication module 74 interfaces the serial communication link 47 from the remote communication module 40 and provides a local communication mechanism for inputting the remote serial control messages 42 to the interface 66 and the microcomputer 56.

The exemplary pushbutton station 8 includes light emitting diode (LED) indicators 76,78,80,82 (respectively labelled PBS,REM,AUTO COM,OFF) which correspond to the control sources 14,16,18,20, respectively, although the invention is applicable to any type of visual or audible indicator. The pushbutton station 8 also includes a switch 84 labelled SELECT. Preferably, the switch 84 is a normally open, momentary membrane pushbutton, although the invention is applicable to a wide variety of switches or pushbuttons for accepting user input. Whenever the LED 76 (PBS) is lit, as explained in greater detail below with FIG. 3, the user employs the pushbutton 22 (STOP) to stop the motor (not shown) associated with the contactors 1,2; the pushbutton 21 ("1") to run the motor (e.g., forward); and the pushbutton 23 ("2") to run the motor (e.g., reverse), although the invention is applicable to any number of contactors for energizing and de-energizing any load. Whenever the LED 82 (OFF) is lit, as described in greater detail below, the separable contacts 48,50 are moved to or maintain the off position and the motor associated with the contactors 1,2 is stopped.

Figure 2:
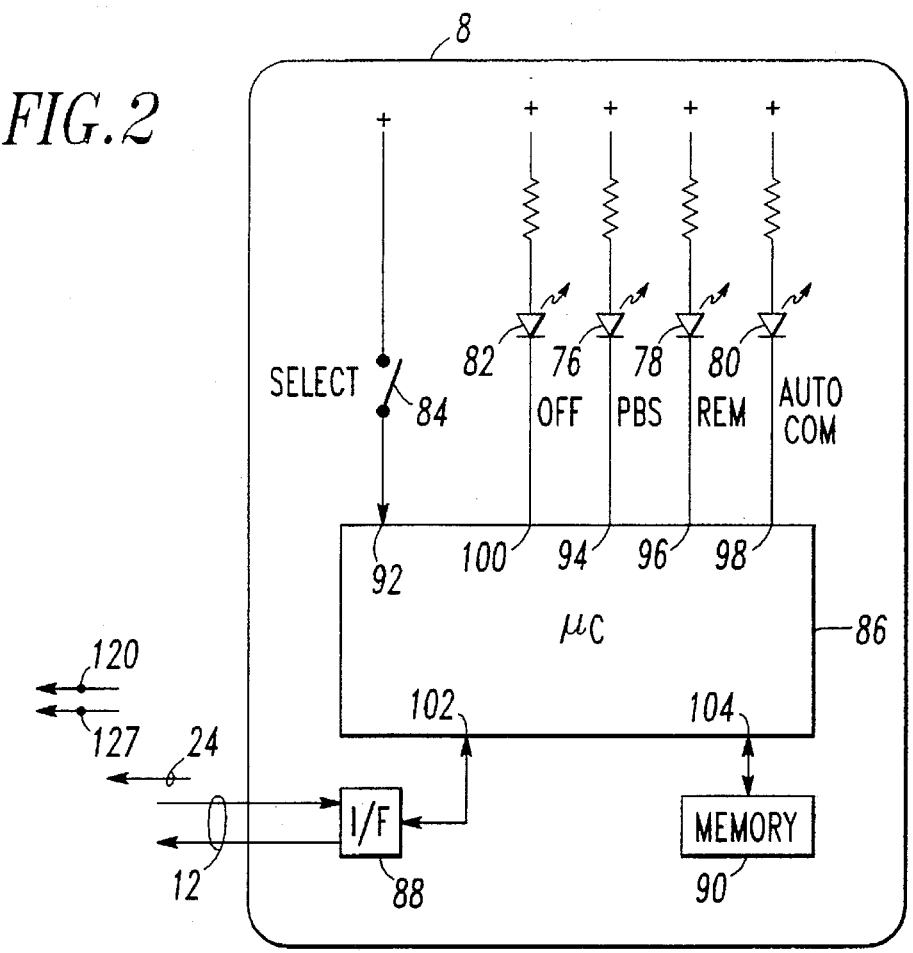
FIG. 2 is a schematic diagram of the pushbutton station of FIG. 1 including a microcomputer.

Referring to FIG. 2, the exemplary pushbutton station 8 includes a microcomputer (μC) 86, an interface (I/F) 88, a memory 90, the switch 84 and the LED's 76,78,80,82. The interface 88 interfaces the serial communication link 12 and provides a mechanism for outputting the local serial control messages 24 from the pushbutton station 8 to the microcomputer 56 of FIG. 1. The microcomputer 86 includes a digital input 92 for inputting a SELECT signal from the switch 84; digital outputs 94,96,98,100 for driving the LED's 76,78,80,82, respectively; a local interface 102 to the interface 88; and a local interface 104 to the memory 90.

Figure 3:
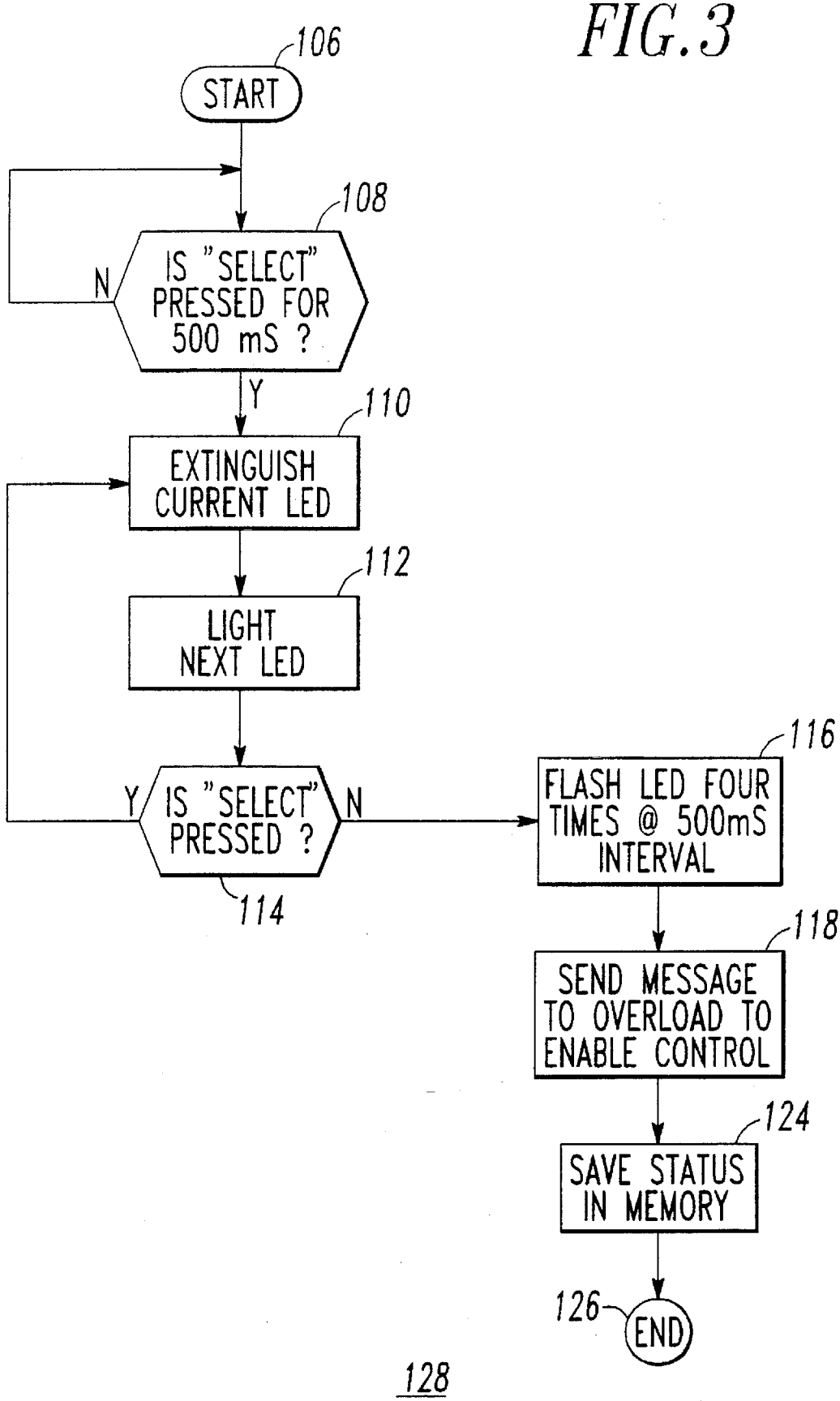
FIG. 3 is a flowchart of a firmware routine of the microcomputer of FIG. 2.

Also referring to FIG. 3, a flowchart of a firmware routine of the microcomputer 86 of FIG. 2 is illustrated. After starting at step 106, the microcomputer 86, at step 108, reads the digital input 92 and detects whether the switch 84 is pressed or actuated for at least a predetermined time interval such as 500 ms, although the invention is applicable to any predetermined time interval. If not, step 108 is repeated. Otherwise, at step 110, a previously selected one (e.g., PBS) of the LED's 76,78,80,82, as stored in the memory 90, is extinguished by outputting an appropriate signal (i.e., off) to the corresponding one (e.g., 94) of the digital outputs 94,96,98,100. Then, at step 112, the next one (e.g., REM) of the LED's 76,78,80,82 is lit. Next, at step 114, the microcomputer 86 reads the digital input 92 again and determines whether the switch 84 is still pressed or actuated. If so, step 110 is repeated after a suitable delay which provides an appropriate time for user response. On the other hand, if the switch 84 is not pressed or actuated, then at step 116, at about the time de-actuation is detected, the selected one of the LED's 76,78,80,82 is flashed (e.g., off and on) a number of times, such as four times, for a predetermined interval, such as 500 ms, by outputting an appropriate signal to the corresponding one of the digital outputs 94,96,98,100. In this manner, step 114 detects de-actuation of the switch 84 to select one of the control sources 14,16,18,20 the representation of which is indicated on the corresponding one of the LED's 76,78,80,82 at the time of the de-actuation. For example, if the LED 78 (REM) is being lit by step 110 and switch 84 is de-actuated at step 114, then the LED 78 (REM) corresponding to the newly selected control source 16 is selected.

Step 116 indicates a representation of the newly selected one of the control sources 14,16,18,20 by flashing a corresponding one of the LED's 76,78,80,82. Next, at step 118, the microcomputer 86 outputs a selected control source control message 120 to the serial communication link 12 using the interfaces 102,88. In this manner, the newly selected one of the control sources 14,16,18,20 is connected to the overload relay 6 of FIG. 1 by the communication link 12. The overload relay 6 receives the control message 120 which signifies the newly selected one of the control sources 14, 16, 18,20 for controlling operation of the overload relay 6. At step 124, a value representing the newly selected one of the LED's 76,78,80,82 is stored in the memory 90 for subsequent use by step 110 the next time the routine is run. The routine ends at step 126.

Also referring to FIG. 1, when the microcomputer 56 receives a particular control message 120 for one (e.g., PBS) of the control sources 14,16,18,20, the other (e.g., REM, AUTO COM, OFF) of the control sources 14,16,18,20 are de-selected. However, such de-selection does not necessarily stop the motor (not shown) associated with the contactors 1,2. Instead, the source of control is merely switched between the control sources 14, 16, 18,20. As described below, an exception exists for the control source 20.

Continuing to refer to FIGS. 1–3, when the control source 20 (i.e., OFF) is selected, the microcomputer 86 outputs an OFF control source control message 127 to the serial communication link 12 using the interfaces 102,88. In this manner, the previously selected one of the control sources 14,16,18 is de-selected. At this time, at most one of the separable contacts 48,50 is in the on position and at least one of the separable contacts 48,50 is in the off position. In response to the control message 127 associated with the control source 20, the microcomputer 56 employs the digital outputs 68,70 to de-energize both the coils 52,54 and move both the separable contacts 48,50, respectively, to the off position. Furthermore, when the control source 20 is selected, the microcomputer 56 inhibits any of the other control sources 14,16, 18 from energizing the coils 52,54 and moving either of the separable contacts 48,50 to the on position.

Referring to FIGS. 2 and 3, the firmware of the microcomputer 86 provides a selection mechanism 128 responsive to the switch 84 for selecting one of the control sources 14,16,18,20. Steps 110, 112 provide a mechanism responding to the actuation of the switch 84 for sequentially indicating representations, at step 112, of some or all of the control sources 14,16,18,20 by lighting the corresponding ones of the LED's 76,78,80,82, although the invention is applicable to any user recognizable visual or audible control source representation. As long as the user continues to actuate the switch 84, the steps 110,112,114 continue to sequentially (e.g., PBS, REM, AUTO COM, OFF, PBS, etc.) light each one of the LED's 76,78,80,82 to sequentially represent the corresponding one of the control sources 14,16,18,20. Prior to step 114, step 112 provides a mechanism for indicating the representation of the originally selected one (e.g., PBS) of the control sources 14,16,18,20 by lighting the corresponding one (e.g., 76) of the LED's 76,78,80,82 with the initial pass through steps 110,112,114, 116. Subsequently, in response to the continued actuation of the switch 84, the repetition of steps 114,110,112 provides a mechanism for sequentially indicating representations of each of the other ones (e.g., REM, AUTO COM, OFF) of the control sources 14,16,18,20 on the other corresponding ones of the LED's 76,78,80,82. Steps 114 and 116 provide a mechanism for selecting one of the control sources 14,16, 18,20 corresponding to the one of the LED's 76,78,80,82 which is lit at the time of the de-actuation of the switch 84.

The selection mechanism 128 of FIG. 3 illustrates the steps of detecting actuation of the switch 84; responding to the actuation and sequentially indicating representations of at least some of the control sources 14,16,18,20 on the corresponding ones of the LED's 76,78,80,82; detecting de-actuation of the switch 84; selecting one of the control sources 14,16,18,20 the representation of which is indicated on the corresponding one of the LED's 76,78,80,82 at the time of the de-actuation; and connecting the selected one of the control sources 14,16,18,20 to the control mechanism provided by the overload relay 6.

When the switch 84 is actuated for the exemplary 500 ms period and held, the one (e.g., PBS) of the LED's 76,78,80, 82, corresponding to the currently selected one (e.g., 14) of the control sources 14,16,18,20 and lit by the previous step 112, extinguishes at step 110. Then, the next LED indicator (e.g., REM) is lit and after a suitable period is extinguished. Next, the subsequent LED indicator (e.g., AUTO COM) is lit and after a suitable period is extinguished. Then, the next LED indicator (e.g., OFF) is lit and after a suitable period is extinguished. If the switch 84 is still held, the original LED indicator (e.g., PBS) is lit and is similarly extinguished. These steps are repeated as long as the switch 84 is depressed. The newly selected one of the control sources 14,16,18,20 is selected by releasing the switch 84 when the corresponding one of the LED's 76,78,80,82 is lit. Finally, the one of the LED's 76,78,80,82 corresponding to the newly selected one of the control sources 14,16,18,20 flashes four times, this LED indicator remains lit, and the newly selected one of the control sources 14,16,18,20 becomes active.

Figure 4:
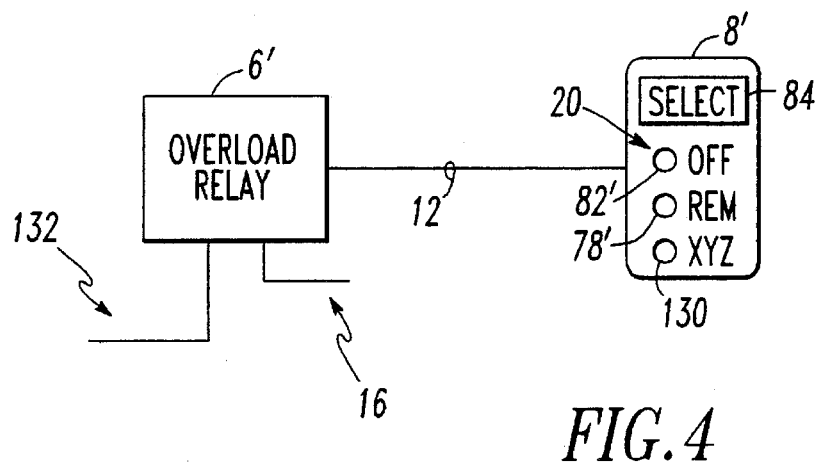
FIG. 4 is a schematic diagram in block form of an overload relay and a pushbutton station in accordance with an alternative embodiment of the invention.

It will be appreciated that other equivalent processor-based, analog or digital logic selection mechanisms may be provided. For example, an equivalent of step 108 may read the digital input 92 and detect whether the switch 84 is momentarily pressed or actuated before proceeding with step 110. Similarly, an equivalent of step 114 may read the digital input 92 and determine whether the switch 84 is not pressed or de-actuated before proceeding with step 110 or, alternatively, is pressed or actuated before proceeding with step 116. It will further be appreciated that other equivalent representations of the control sources 14,16,18,20 may be provided. As a non-limiting example, flashing patterns or colors may be employed for display at steps 110 and 112. In addition, audible patterns or tones may be employed. It will also be appreciated that any number of the control sources 14,16,18,20 or additional control sources may be provided. For example, FIG. 4 illustrates an alternative overload relay 6' including controller 8' having indicator lamps 82', 78' and 130 for control sources 20, 16 and 132 (e.g., XYZ), respectively.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A control apparatus for an electrical switching device including separable contacts, operating means for operating said separable contacts and control means responsive to a plurality of control sources for controlling said operating means, said control apparatus comprising:

plural indicator means each of which corresponds to one of said control sources;

switch means; and selection means responsive to said switch means for selecting one of said control sources, said selection means including:

means for detecting actuation of said switch means;

means responding to said actuation for sequentially indicating representations of at least some of said control sources on the corresponding ones of said indicator means; and means for detecting de-actuation of said switch means to select one of said control sources the representation of which is indicated on the corresponding one of said indicator means at the time of said de-actuation.

2. The control apparatus as recited in claim 1 wherein said means responding to said actuation for sequentially indicating representations includes means for sequentially lighting each one of said indicator means to sequentially represent the corresponding one of said control sources.

3. The control apparatus as recited in claim 2 wherein said means for sequentially lighting includes means for extinguishing a previously selected one of said indicator means.

4. The control apparatus as recited in claim 1 wherein said means responding to said actuation includes:
 means for storing a representation of an originally selected one of said control sources;
 means for extinguishing the representation of the originally selected one of said control sources from a corresponding one of said indicator means; and
 means for sequentially indicating representations of each of the other ones of said control sources on the other corresponding ones of said indicator means.

5. The control apparatus as recited in claim 1 wherein said means responding to said actuation includes:
 means for sequentially indicating representations of each of said control sources on the corresponding ones of said indicator means.

6. The control apparatus as recited in claim 2 wherein said means for sequentially lighting includes means for extinguishing one of said indicator means before lighting the next sequential one of said indicator means.

7. The control apparatus as recited in claim 2 wherein said means for detecting de-actuation includes means for selecting one of said control sources corresponding to the one of said indicator means which is lit at the time of said de-actuation.

8. The control apparatus as recited in claim 3 wherein said selection means further includes means for flashing the one of said indicator means corresponding to the selected one of said control sources a predetermined number of times at about the time of said de-actuation.

9. An electrical switching device adapted for control by a plurality of control sources, said electrical switching device comprising:
 separable contacts;
 operating means for operating said separable contacts;
 control means responsive to said control sources for controlling said operating means;
 plural indicator means each of which corresponds to one of said control sources;
 switch means; and
 selection means responsive to said switch means for selecting one of said control sources, said selection means including:
  means for detecting actuation of said switch means;
  means responding to said actuation for sequentially indicating representations of at least some of said control sources on the corresponding ones of said indicator means;
  means for detecting de-actuation of said switch means to select one of said control sources the representation of which is indicated on the corresponding one of said indicator means at the time of said de-actuation; and
  means for connecting the selected one of said control sources to said control means.

10. The electrical switching device as recited in claim 9 wherein:
 said control means includes at least one of:
  means for inputting a first control signal,
  means for inputting a second control signal, and
  local communication means for inputting a third control signal; and wherein:
 said control sources include at least one of:
  means for sourcing the first control signal to said means for inputting the first control signal,
  means for sourcing the second control signal to said means for inputting the second control signal, and
  remote communication means for sourcing the third control signal to said local communication means.

11. The electrical switching device as recited in claim 10 wherein said means for sourcing the first control signal is local with respect to said control means; and wherein said means for sourcing the second control signal is generally remote with respect to said control means.

12. The electrical switching device as recited in claim 9 wherein said separable contacts include an off position; wherein:
 said control means includes at least two of:
 means for inputting a first control signal,
 means for inputting a second control signal,
 local communication means for inputting a third control signal, and
 means controlling said operating means to move said separable contacts to the off position; and wherein:
 said control sources include at least two of:
  means for sourcing the first control signal to said means for inputting the first control signal,
  means for sourcing the second control signal to said means for inputting the second control signal,
  remote communication means for sourcing the third control signal to said local communication means, and
  control source means cooperating with said means controlling said operating means to move said separable contacts to the off position.

13. The electrical switching device as recited in claim 9 wherein said switch means is a normally open, momentary pushbutton.

14. A motor starter adapted to be controlled from a plurality of control sources, said motor starter comprising:
 electrical contactor means including separable contacts and operating means for opening and closing said separable contacts;
 overload relay means operatively associated with said electrical contactor means and responsive to said control sources for controlling said operating means;
 plural indicator means each of which corresponds to one of said control sources;
 switch means; and
 selection means responsive to said switch means for selecting one of said control sources, said selection means including:
  means for detecting actuation of said switch means;
  means responding to said actuation for sequentially indicating representations of at least some of said control sources on the corresponding ones of said indicator means;
  means for detecting de-actuation of said switch means to select one of said control sources the representation of which is indicated on the corresponding one of said indicator means at the time of said de-actuation; and means for connecting the selected one of said control sources to said overload relay means.

15. The motor starter as recited in claim 14 wherein:

said overload relay means includes:

means for inputting a remote control signal, means for inputting a local control signal, and first communication means for inputting a serial control signal; and wherein:

said control sources include:

contact means for sourcing the remote control signal to said means for inputting the remote control signal, means for sourcing the local control signal to said means for inputting the local control signal, and second communication means for sourcing the serial control signal to said first communication means.

16. The motor starter as recited in claim 14 wherein said electrical contactor means includes a first contactor having first separable contacts and first operating means for opening and closing the first separable contacts, and a second contactor having second separable contacts and second operating means for opening and closing the second separable contacts; wherein said overload relay means includes means for controlling the first and second operating means; and wherein said means for connecting the selected one of said control sources to said overload relay means includes means for communicating the selected one of said control sources to the means for controlling the first and second operating means.

17. The motor starter as recited in claim 14 wherein said means for detecting actuation of said switch means includes means for detecting actuation of said switch means for a predetermined time interval.

18. The motor starter as recited in claim 14 wherein said means responding to said actuation includes means for extinguishing a representation of the selected one of said control sources on a corresponding one of said indicator means, and means for sequentially indicating representations of each of the other ones of said control sources on the other corresponding ones of said indicator means.

19. A method for selecting one of a plurality of control sources for an electrical switching device including a switch, a plurality of indicators each of which corresponds to one of said control sources, separable contacts, operating means for operating said separable contacts and control means responsive to said control sources for controlling said operating means, said method comprising the steps:

detecting actuation of said switch;

responding to said actuation and sequentially indicating representations of at least some of said control sources on the corresponding ones of said indicators;

detecting de-actuation of said switch;

selecting one of said control sources the representation of which is indicated on the corresponding one of said indicators at the time of said de-actuation; and connecting said selected one of said control sources to said control means.

* * * * *